United States Patent [19]

Bishop

[11] Patent Number: 4,920,929
[45] Date of Patent: May 1, 1990

[54] VARIABLE SPEED COUPLING SYSTEM FOR COOLING AN ENGINE

[75] Inventor: Edward T. Bishop, Northants, United Kingdom

[73] Assignee: Jaguar Cars Limited, England

[21] Appl. No.: 273,260

[22] Filed: Nov. 18, 1988

[30] Foreign Application Priority Data

Nov. 18, 1987 [GB] United Kingdom ............... 8726966

[51] Int. Cl.⁵ ............................................. F01P 7/10
[52] U.S. Cl. ............................ 123/41.49; 123/41.12; 192/21.5
[58] Field of Search .................... 123/41.49, 41.12; 192/58 B, 82 T, 21.5

[56] References Cited

U.S. PATENT DOCUMENTS

| | | | |
|---|---|---|---|
| 2,575,360 | 11/1951 | Rabinou | 192/21.5 |
| 2,661,825 | 12/1953 | Winslow | 192/21.5 |
| 2,886,151 | 5/1959 | Winslow | 192/21.5 |
| 4,222,353 | 9/1980 | Abe et al. | 123/41.12 |

FOREIGN PATENT DOCUMENTS

| | | |
|---|---|---|
| 649553 | 1/1951 | United Kingdom . |
| 768861 | 2/1957 | United Kingdom . |
| 985827 | 3/1965 | United Kingdom . |
| 1262854 | 2/1972 | United Kingdom . |
| 1347980 | 2/1974 | United Kingdom . |
| 2083595 | 3/1982 | United Kingdom . |
| 2092273 | 8/1982 | United Kingdom . |
| 2125230 | 2/1984 | United Kingdom . |

OTHER PUBLICATIONS

Journal of Electrostatics, vol. 17, No. 2, Jul. 1985, pp. 181-191, Elsevier Science Publishers B.V.
Patent Abstracts of Japan, vol. 10, No. 281 (M-520) [2337], 25th Sep. 1986 & JP-A-61 102 313 (Toyota Motor Corp.) 21-05-1986.

Primary Examiner—Noah P. Kamen
Attorney, Agent, or Firm—Davis, Bujold & Streck

[57] ABSTRACT

An engine cooling fan includes a first member adapted to be drivingly connected to the engine and a second member mounted rotatably relative to the first member, a series of fan blades are provided on the second member, the first and second members having opposed parallel faces separated from one another, the space between the faces being filled with a fluid the viscosity of which may be varied by applying a magnetic or electric field, the first and second members being arranged such that an electric or magnetic field may be applied therebetween. The electric or magnetic field is controlled by a control unit in response to signals corresponding to coolant temperature and engine speed.

7 Claims, 1 Drawing Sheet

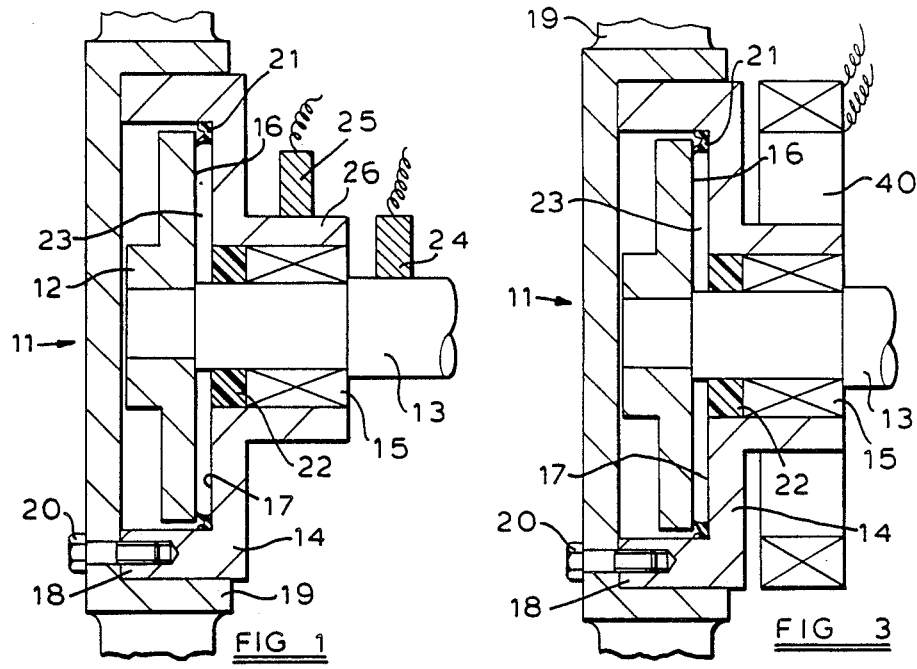
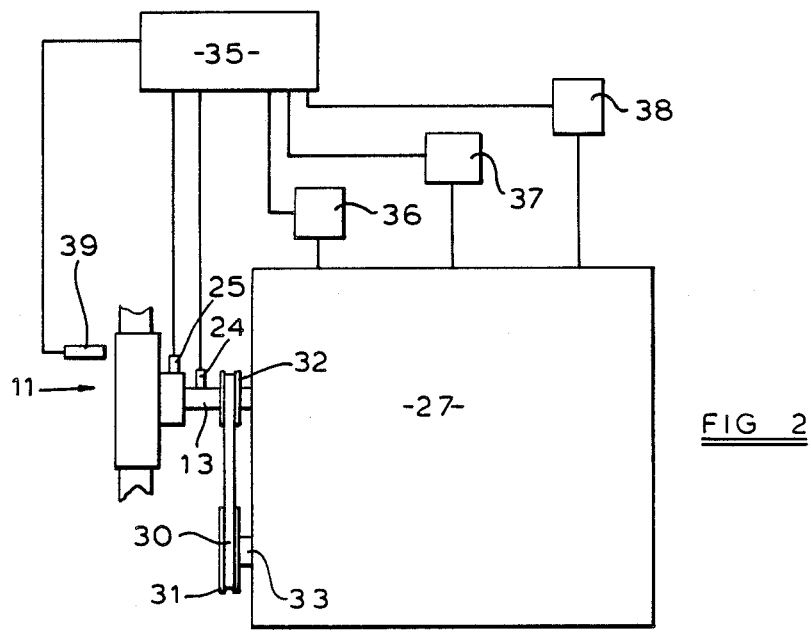

VARIABLE SPEED COUPLING SYSTEM FOR COOLING AN ENGINE

BACKGROUND TO THE INVENTION

The present invention relates to cooling systems and in particular to cooling systems for internal combustion engines, in which a fan is driven by the engine.

It is known to provide engine cooling fans driven by the engine through a viscous coupling. The viscous coupling permits the cooling fan to free-wheel while the coolant temperature is below a predetermined value, the coupling engaging when the temperature of the coolant rises above that value. When the coupling is engaged the fan is however driven at engine speed or some proportion of engine speed.

With electrical cooling fans, it is possible to control the speed of the fan totally independently of engine speed. However, electrical fans have a significant power requirement and consequently a means of power generation driven by the engine must be provided to generate sufficient energy when required. As the generation means is driven continuously it will impose a load on the engine whether the electrical fan is driven or not.

The present invention provides an engine driven cooling fan which may be driven independently of the speed of the engine, the fan when not being driven imposing little or no load on the engine.

SUMMARY OF THE INVENTION

According to one aspect of the present invention an engine cooling fan comprises a first member which is adapted to be drivingly connected to the engine and a second member mounted rotatably relative to the first member, a series of fan blades being provided on said second member, said first and second members having opposed parallel faces separated from one another, the space between said faces being filled with a fluid the viscosity of which may be varied by applying a magnetic or electric field and means being provided to apply a magnetic or electric field to the fluid.

With the fan disclosed above, the electric or magnetic field may be controlled to adjust the viscosity of the fluid, so that slippage between the first and second members will permit the fan to rotate at the appropriate speed and maintain the optimum operating temperature of the engine irrespective of the engine speed.

This invention may utilise electrorheological or magnetorheological fluids of known composition. With electrorheological fluids, the two members may be insulated from one another and an electric field established by applying an EMF across the members. The members may be connected to a suitable power source by a slip ring arrangement. Alternatively, where a magnetorheological fluid is used, an electromagnet may be associated with one or both members.

According to a second aspect of the present invention an engine cooling system comprises a cooling fan as described above, a control unit for controlling the electric or magnetic field applied to the fluid, a coolant temperature sensor and an engine speed sensor, signals from the coolant temperature sensor and engine speed sensor being processed by the control unit to determine the strength of the electric or magnetic field applied to the fluid.

The electric or magnetic field applied to the fluid may thus be controlled so that the viscosity of the fluid and thus the slippage between the first and second members is such that the speed of the fan will provide sufficient cooling to maintain the engine at its optimum operating temperature.

In a typical water cooled engine, the cooling of the coolant depends on the amount of air passing through a radiator. This air is either drawn through the radiator by the cooling fan or passes through the radiator as a result of movement of vehicle. At higher speeds, the motion of the vehicle will normally be sufficient to provide cooling and only at low vehicle speeds or under high load conditions, will the cooling fan be required. In addition to the coolant temperature sensor and engine speed sensor, a throttle opening sensor may be included in the system. Comparison of the throttle opening with the engine speed will provide a measure of the load applied to the engine and this may be taken into account by the control means.

BRIEF DESCRIPTION OF THE DRAWINGS

An embodiment of the invention is now described, by way of example only, with reference to the accompanying drawings in which:

FIG. 1 illustrates in cross section an engine cooling fan in accordance with the present invention;

FIG. 2 is a block diagram illustrating an engine cooling system utilising the fan illustrated in FIG. 1; and FIG. 3 illustrates an alternative form of engine cooling fan in accordance with the present invention.

DESCRIPTION OF A PREFERRED EMBODIMENT

As illustrated in FIG. 1 an engine cooling fan 11 comprises a first member 12 made of electrically conductive material mounted on shaft 13 for rotation therewith. A second member 14 made of electrically conductive material is mounted on a shaft 13 by means of bearing 15, so that it is rotatable with respect to the shaft 13. The bearing 15 is made of electrically insulative material such as nylon.

The first and second members 12 and 14 have parallel opposed faces 16 and 17 respectively. A cylindrical flange formation 18 extends axially from the outer periphery of member 14 so that it surrounds member 12. A moulded plastic fan blade assembly 19 is bolted onto the end of flange 18 by a series of angularly spaced bolts 20.

The gap between faces 16 and 17 is closed at its outer periphery by a lip seal 21 and at its inner periphery by seal 22, to define a fluid tight chamber 23 which is filled with an electrorheological fluid.

Brushes 24 and 25 engage the shaft 13 and hub portion 26 of member 14 respectively, to provide rotary electrical connections therewith.

As illustrated in FIG. 2, the shaft 13 may typically be an extension of the water pump drive shaft of the engine 27, which is driven by belt 30 and pulleys 31 and 32 from the crank shaft 33 of the engine 27, in conventional manner. Alternatively, the fan 11 may be driven directly from the crank shaft 33 or be mounted on a independent shaft which is driven by belt, chain or other suitable means.

The brushes 24 and 25 of cooling fan 11 are connected to an electronic control unit 35, which controls the EMF which is applied across members 12 and 14 and thus the electric field applied across the electrorheological fluid in chamber 23. The viscosity of the electrorheological fluid varies with the strength of the electric field and thus slippage between the first and second members 12 and 14 may be controlled thereby controlling the speed of the fan to provide sufficient cooling to maintain the engine 27 at its optimum operating temperature.

Inputs to the control unit 35 are provided by an engine coolant temperature sensor 36 and an engine speed sensor 37. The engine speed sensor 37 may operate from the engine ignition system, for example an inductive probe being provided on the king lead of the distributor to provide a signal proportional to the frequency of ignition pulses and hence engine speed. Alternatively, independent engine speed monitoring means, for example in the form of a toothed wheel driven by the crank shaft and an inductive pickup adjacent the teeth of the wheel, may be used. The speed of the fan is also monitored by pickup 39 which provides a feed back loop to the control unit 35.

The signals from the temperature sensor 36 and engine speed sensor 37 are processed by the control unit 35 and the EMF applied to the cooling fan 11 is controlled to provide the required slippage between members 12 and 14.

Furthermore, a potentiometer 38 is provided on the throttle control to provide a signal corresponding to the degree of throttle opening. The signal from potentiometer 38 is also fed to the control unit 35 which, by comparing the throttle opening signal with the engine speed signal can provide a measure of the load under which the engine 27 is operating and this may also be taken into account in controlling the electric field applied across the electrorheological fluid.

According to a preferred embodiment the fan 11 is of coarse pitch and, when driven is driven at slow speeds. By means of control unit 35, the fan 11 may be driven at a constant slow speed irrespective of the engine speed or at a speed varying between zero and a slow maximum speed which may be proportional, for example, to engine speed or to the load under which the engine is operating.

In the cooling fan assembly 11 illustrated in FIG. 3, the second member 14 is made of non-ferromagnetic material. An electromagnet 40 is non-rotatably supported concentrically of the shaft 13 adjacent member 14 so that when energised it will produce a substantially axial magnetic field which extends across the gap 23 between members 12 and 14, said gap being filled with a magnetorheological fluid. The electromagnet 40 is connected to control unit 35 which will apply an EMF to the electromagnet in similar manner to the embodiment illustrated in FIGS. 1 and 2, thus controlling the magnetic field generated thereby to control the viscosity of the magnetorehological fluid and the drive transmitted from the shaft 13 to fan blades 19.

With the electromagnetic arrangement described above, member 12 and the flange portion 18 of member 14 may be made of ferromagnetic material in order to provide a flux return path for the magnetic field. Alternatively the electromagnet 40 may be mounted on one of the members 12 or 14 for rotation therewith.

Various modifications may be made without departing from the invention. For example, other parameters of the engine or auxiliary systems driven by the engine and which will impose further loads on the engine, for example air conditioning systems, may be monitored and taken into account in controlling the electric field applied across the electrorheological fluid.

I claim:

1. An engine cooling fan comprising a first member which is adapted to be drivingly connected to the engine and second member mounted rotatably relative to the first member, a series of fan blades being provided on said second member, said first and second members having opposed parallel faces separated from one another, the space between said faces being filled with a fluid the viscosity of which may be varied by applying a magnetic or electric field and means being provided responsive to engine operating parameters to apply a magnetic or electric field to the fluid whereby the strength of the magnetic or electric field applied to the fluid is determined by said operating parameters to vary transmission of rotational energy from the first member to the second member to provide a desired transmission ratio therebetween up to the maximum possible transmission ratio.

2. A cooling fan according to claim 1 in which the fluid is an electrorehological fluid.

3. A cooling fan according to claim 2 in which the first and second members are made of electrically conductive material, the members being insulated from one another and an electric field is established between the members by applying an EMF across the members.

4. An engine cooling fan according to claim 1 in which the fluid is a magnetorheological fluid.

5. An engine cooling fan according to claim 4 in which an electromagnet is supported with one or both of the first and second members.

6. An engine cooling system comprising a fan as claimed in claim 1, a control unit for controlling the electric or magnetic field applied to the fluid, a coolant temperature sensor and an engine speed sensor, signals from the coolant temperature sensor and engine speed sensor being processed by the control unit to determine the strength of the electric or magnetic field applied to the fluid.

7. An engine cooling system according to claim 6 in which means is provided to sense the degree of opening of the throttle, the signal produced by such means being processed by the control unit and taken into account in determining the strength of the electric or magnetic field applied to the fluid.

* * * * *